United States Patent [19]

Holly et al.

[11] Patent Number: 4,597,135
[45] Date of Patent: Jul. 1, 1986

[54] FOOD PATTY FORMING METHOD AND APPARATUS EMPLOYING TWO OR MORE AGITATOR BARS

[75] Inventors: Harry H. Holly; James A. Holly, both of Boca Raton, Fla.

[73] Assignee: Holly Systems, Inc., Boca Raton, Fla.

[21] Appl. No.: 582,011

[22] Filed: Feb. 21, 1984

[51] Int. Cl.⁴ ............................................... A22C 7/00
[52] U.S. Cl. ........................................... 17/45; 17/32
[58] Field of Search ............... 17/32; 426/513, 516, 426/646; 425/197, 200, 554, 555, 556, 573, 276 R; 264/108

[56] References Cited

U.S. PATENT DOCUMENTS

| | | | |
|---|---|---|---|
| 444,052 | 1/1891 | Hottman . | |
| 2,386,775 | 10/1945 | Balzarini | 17/32 X |
| 2,794,210 | 6/1957 | Opiekon | 17/39 |
| 2,858,219 | 10/1958 | Benson . | |
| 2,869,602 | 1/1959 | Rathien . | |
| 3,009,413 | 11/1961 | Alexander et al. | 100/218 |
| 3,052,919 | 9/1962 | Rayburn . | |
| 3,111,739 | 11/1963 | Horton et al. | 425/197 |
| 3,137,029 | 6/1964 | Zolt | 17/32 |
| 3,163,541 | 12/1964 | Mainhardt et al. . | |
| 3,293,688 | 12/1966 | Holly | 17/32 |
| 3,574,633 | 4/1971 | Flier . | |
| 3,609,806 | 10/1971 | Schippers et al. | 425/197 |
| 3,793,466 | 2/1974 | Kawkins et al. | 426/274 |
| 3,834,849 | 9/1974 | Supran et al. | 426/513 X |
| 3,851,355 | 12/1974 | Hughes | 17/32 |
| 3,863,020 | 11/1973 | Robinson | 426/513 |
| 3,903,315 | 9/1975 | Giles et al. | 426/388 |
| 3,939,530 | 2/1976 | Holly | 17/32 |
| 3,947,535 | 3/1976 | Bagg et al. | 264/108 X |
| 3,991,440 | 11/1976 | Hendrickson, Jr. | 17/32 |
| 4,036,997 | 7/1977 | Ver Berg | 426/513 X |
| 4,043,728 | 8/1977 | Holly | 17/32 X |
| 4,068,008 | 1/1978 | Orchard | 426/513 X |
| 4,113,415 | 9/1978 | Holly | 17/32 X |
| 4,118,831 | 10/1978 | Holly et al. | 17/32 |
| 4,138,768 | 2/1979 | Roth | 17/32 |
| 4,148,598 | 4/1979 | Colosimo | 17/32 X |
| 4,182,003 | 1/1980 | Lamartino et al. | 17/32 |
| 4,205,415 | 6/1980 | Orchard | 17/32 |
| 4,272,864 | 6/1981 | Holly | 17/32 |
| 4,293,979 | 10/1981 | Colosimo et al. | 17/32 |
| 4,317,259 | 3/1982 | Wagner | 17/32 |
| 4,338,702 | 7/1982 | Holly | 17/32 |
| 4,343,068 | 8/1982 | Holly | 17/32 X |
| 4,356,595 | 11/1982 | Sandberg et al. | 17/32 X |
| 4,372,008 | 2/1983 | Sandberg | 17/32 |
| 4,422,372 | 12/1983 | Hoezee | 426/516 X |

FOREIGN PATENT DOCUMENTS 2258795 8/1975 France .
1454216 11/1976 United Kingdom .

OTHER PUBLICATIONS

"Hollymatic 580 Instruction Manual Parts List" (dated 6-75).

Primary Examiner—Willie G. Abercrombie
Attorney, Agent, or Firm—Dressler, Goldsmith, Shore, Sutker & Milnamow, Ltd.

[57] ABSTRACT

A method and apparatus for forming a patty of food material are disclosed. The food material is forced through apertures in a foraminous member into a mold opening in a mold plate to form the patty. Multiple agitator bars are provided on the upstream side of the foraminous member to dislodge tissue fibers.

16 Claims, 20 Drawing Figures

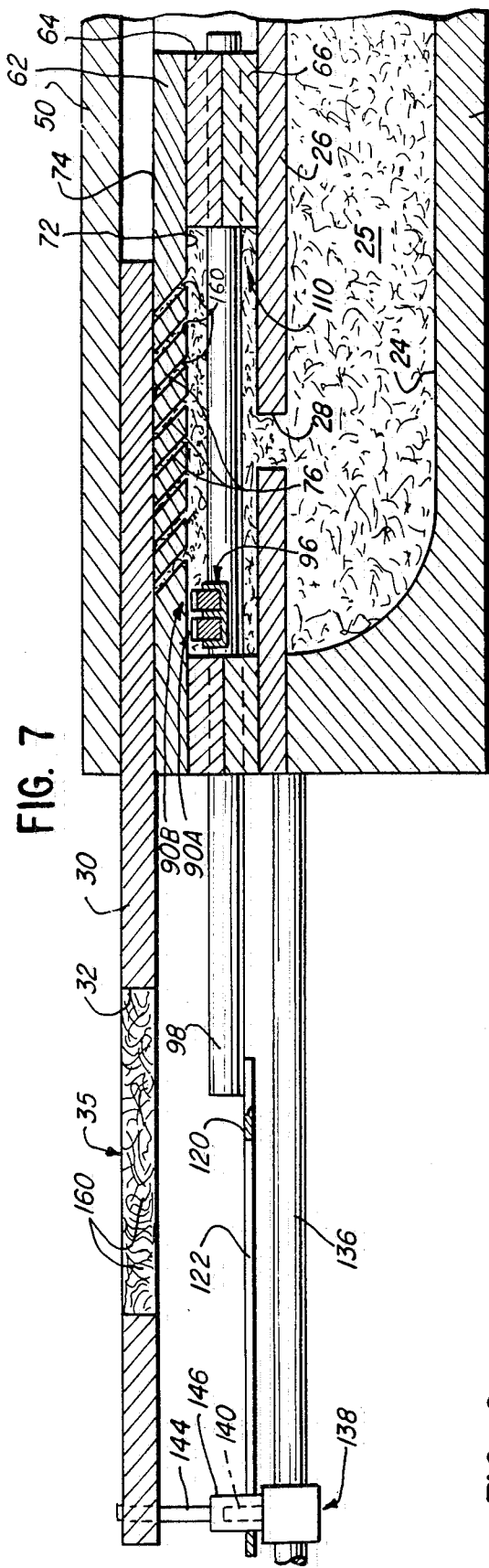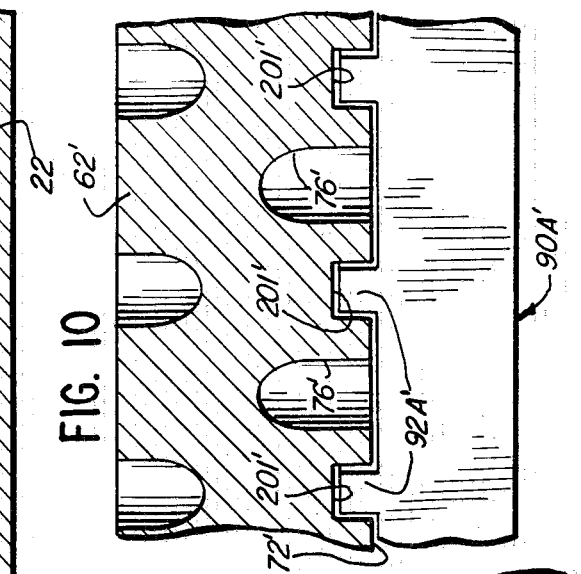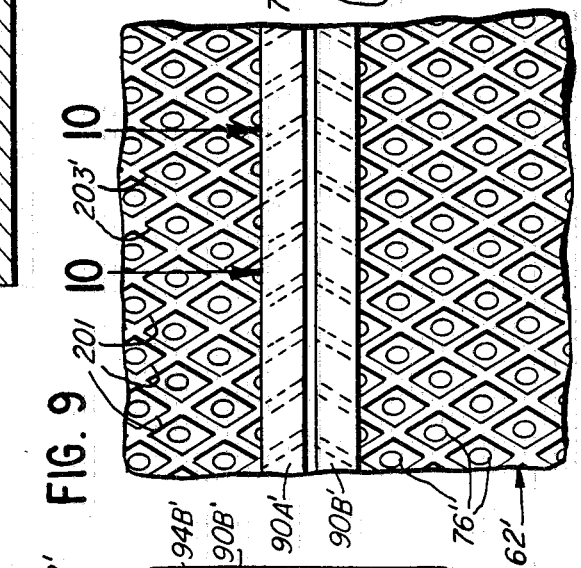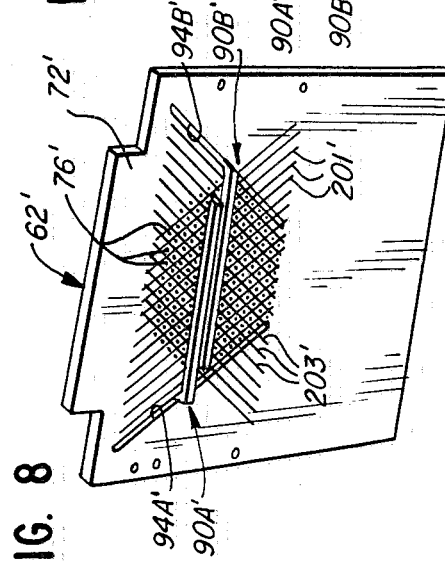

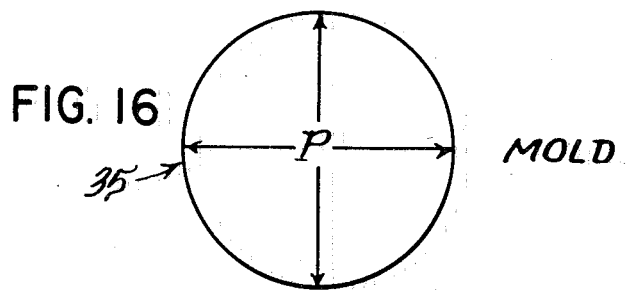
FIG. 16 MOLD
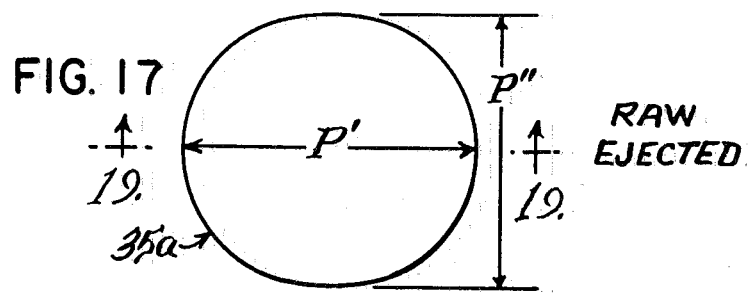
FIG. 17 RAW EJECTED
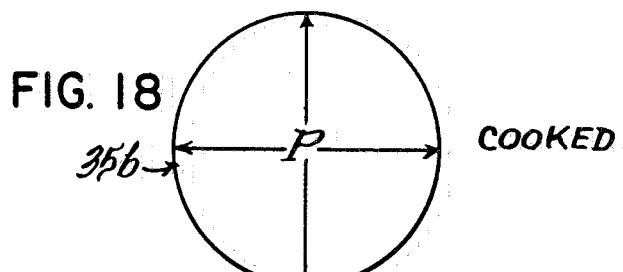
FIG. 18 COOKED
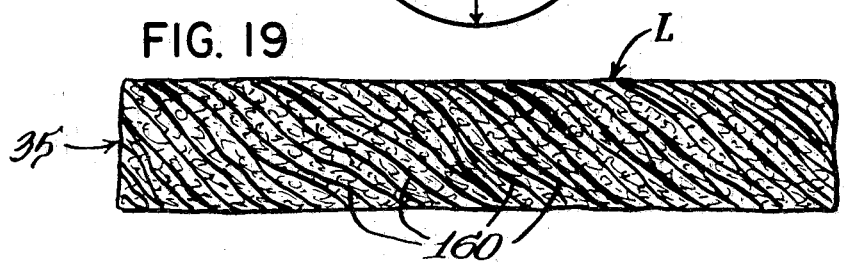
FIG. 19
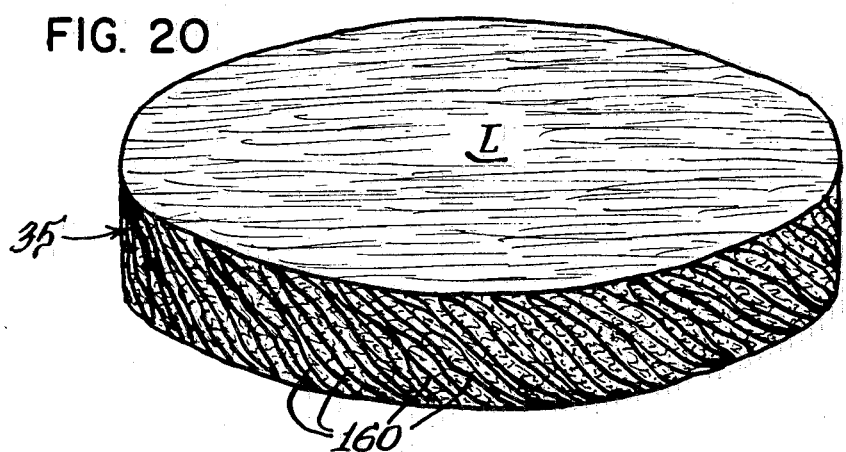
FIG. 20 ize_tokens # FOOD PATTY FORMING METHOD AND APPARATUS EMPLOYING TWO OR MORE AGITATOR BARS This invention relates to fabrication of a patty of food material.

BACKGROUND OF THE INVENTION

A novel patty of plastic food material, such as ground meat and the like, as well as novel methods and apparatus for forming the patty, have been developed wherein, inter alia, the food material is forced through cavities or apertures of a foraminous member into a mold to form a patty in which the food material defines interstitial voids for entrapping air and providing retention of cooking juices to promote more rapid and uniform cooking of the patty. Such methods and apparatus are disclosed in the Harry H. Holly U.S. Pat. Nos. 4,272,864 and 4,338,702.

The U.S. Pat. Nos. 4,356,595 and 4,372,008 to Sandberg et al. disclose apparatus for forming a meat patty by forcing ground meat under pressure through a foraminous member which defines a plurality of orifices.

When food material that contains tissue fibers, especially meat and the like, is forced through a foraminous member, opposite end portions of a single tissue fiber can be forced into different apertures in the foraminous member. The fibers, being stringy and thin, are not easily severed under the influence of conventional molding pressures.

A number of such fibers may be forced against the upstream side of the foraminous member in a manner that tends to plug up the foraminous member apertures. This tendency of tissue fibers to plug up foraminous member apertures was identified by Harry H. Holly and is described in detail in the above-identified U.S. Pat. No. 4,272,864 with reference to FIG. 23 of that patent.

Some of the apparatus and methods disclosed in some of the above-discussed U.S. patents are intended to function, at least with certain types of food material, so as to minimize or prevent the plugging up of the foraminous member with tissue fibers on the upstream side of the foraminous member. However, it would be desirable to provide a less complex method and apparatus for preventing plugging by tissue fibers, as well as to provide a method and apparatus that would be very effective with a great many types of food material.

Further, it would be beneficial if such an improved method and apparatus could be effected with a minimum of movement of the food material so as to avoid the undesirable effects of excessive working of the food material. Excessive working of some types of food material, such as ground beef, can make the food material less tender.

Finally, it would be advantageous if apparatus could be provided for quickly and easily converting conventional patty molding machines to the improved type of molding machine wherein the food material is forced through a foraminous member and wherein the "conversion" apparatus has the capability for dislodging tissue fibers from the upstream side of the foraminous member so as to avoid or minimize plugging up of the apparatus.

SUMMARY OF THE INVENTION

The present invention provides an improved method and apparatus for forming a patty of food material. The teachings of the present invention can be employed in those patty molding systems in which food material containing tissue fibers is forced through apertures in a foraminous member into a mold cavity. The apertures may have a variety of shapes and orientations within the foraminous member.

The present invention includes an improved apparatus and an improved method for minimizing or preventing tissue fiber build up or clogging of the apertures on the upstream side of the foraminous member. In particular, at least two separate agitator bars are provided along the upstream side of the foraminous member. Relative movement is effected between the foraminous member on one hand and the agitator bars on the other hand so as to produce agitation along the upstream side of the foraminous member to dislodge tissue fibers that may have lodged on the upstream side of the foraminous member.

In a preferred embodiment of the present invention, additional features are provided. The foraminous member apertures each define an opening in the upstream side of the foraminous member, and the openings are arranged in a first set of spaced-apart parallel rows and in second set of spaced-apart parallel rows which are oriented at an acute angle relative to the first set of rows. The space between each row of openings may be flat or may have some other configuration (e.g., a rib).

Each of the agitator bars has plurality of spaced-apart teeth with at least one tooth between two adjacent rows of the foraminous member aperture openings. Each bar is moved on the upstream side of the foraminous member along a path parallel to one set of rows of aperture openings, but at an angle to the path of movement of the other bar. Relative movement thus occurs between the two agitator bars as well as between each bar and the foraminous member.

The present invention also teaches, in a preferred embodiment, that improved agitation can be effected even more efficiently when the teeth of each of the two or more agitator bars are in contact with the upstream side of the foraminous member. Specific structures are provided for ensuring such contact, including novel spring mechanisms associated with each agitator bar.

Finally, the two or more agitator bars may be readily provided, along with the foraminous member if desired, as part of a subassembly for "converting" existing molding machines to an improved apparatus.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, and in which like numerals are employed to designate like parts throughout the same.

FIG. 7 is a view similar to FIG. 6, but showing the mold plate in the patty ejecting position;

FIG. 8 is a perspective view of the upstream side of a second embodiment of a foraminous member forming part of the subassembly apparatus and showing two agitator bars disposed adjacent the upstream side of the foraminous member;

FIG. 9 is a greatly enlarged, fragmentary, plan view of a portion of the upstream side of the foraminous member illustrated in FIG. 8 and showing the two agitator bars adjacent the foraminous member;

FIG. 10 is a even more greatly enlarged, fragmentary, cross-sectional view taken generally along the plane 10—10 in FIG. 9;

FIGS. 16, 17, and 18 are schematic top plan views of a hamburger patty and illustrate, respectively, the patty in the molded condition, the ejected condition, and the cooked condition;

FIG. 19 is an enlarged, cross-sectional view of the patty taken generally along the plane 19–17 in FIG. 17; and FIG. 20 is a perspective view of the patty illustrated in FIGS. 17 and 19.

DESCRIPTION OF THE PREFERRED EMBODIMENT

Figure 1:
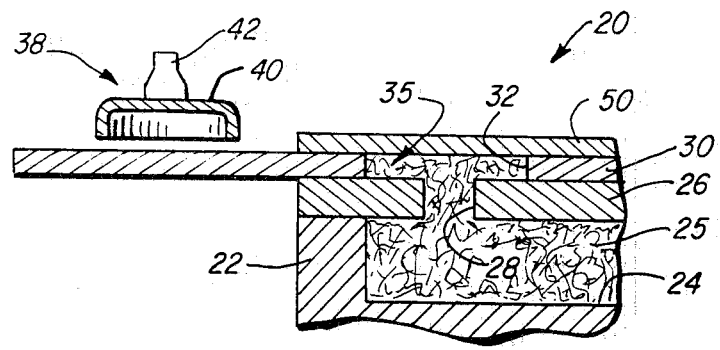
FIG. 1 is a fragmentary, partial cross-sectional view of a portion of a machine for molding a patty of plastic food material which contains tissue fibers.

While this invention is susceptible of embodiment in many different forms, there is shown in the drawings and will herein be described in detail preferred features of the invention. It will be understood, however, that the present disclosure is to be considered as an exemplification of the principles of the invention and is not intended to limit the invention to the specific form of the combination of features that are illustrated and described.

The precise shapes and sizes of the components herein described are not essential unless otherwise indicated.

It will be understood that reference is made herein, and in the claims, to various terms such as "food material," "tissue," "fiber," and "plastic." Each such term is used in a sense that may have a denotation not necessarily identical to the denotation of the term as used in the technical fields of chemistry, medicine, rheology, and the like. Rather, such terms are used herein to generally describe various substances exhibiting the characteristics discussed herein and to which the present invention is directed.

For ease of description, the operation of apparatus disclosed herein is described in a normal operating position and terms such as upper, lower, horizontal, etc. will be used with reference to the normal operating position. It will be understood, however, that the apparatus may be manufactured, stored, transported, and sold in an orientation other than the normal operating position described.

The apparatus disclosed herein has certain conventional mechanisms, including drive mechanisms, food material pressurizing mechanisms, food material receiving structures, and control mechanisms, the details of which, though not fully illustrated or described, will be apparent to those having skill in the art and an understanding of the necessary functions of such mechanisms.

The apparatus disclosed herein may be constructed of a variety of materials. The choice of material in some cases is dependent upon a particular application involved and other variables, as those skilled in the art will appreciate.

CONVENTIONAL MOLDING MACHINE

Part of one basic type of conventional machine 20 for forming or molding a patty of food material which may contain tissue fibers, (such as are found in pieces of meat and the like) is illustrated in FIG. 1. Machines of this type are manufactured by, among others, Hollymatic Corporation, 600 East Plainfield Road, Countryside, Ill., 60525, U.S.A. Machines of this type can be adapted to use the subassembly 60 (FIG. 2) and alternate embodiments described hereinafter. The embodiments of the subassembly 60 illustrated herein are especially designed for being used with ("converting") molding apparatus or machines marketed by Hollymatic Corporation in the United States of America under the designations "Hollymatic 500" and "Hollymatic 580".

Although the specific embodiments of the novel processes and subassembly apparatus disclosed herein are adapted for use with, and are illustrated herein as incorporated in, the above-identified conventional Hollymatic Corporation machines, it is to be realized that the principles of the present invention may also be used, with appropriate modifications, in other patty molding machines of the same general type as the Hollymatic Corporation machines wherein food material is forced under pressure into a mold opening to form a patty.

As illustrated in FIG. 1, the machine 20 includes a lower portion 22 defining part of a first pressurizable feed chamber or food material reservoir 24. The top of the reservoir 24 is covered and defined by a cover plate 26. The cover plate 26 defines a feed aperture 28 through which pressurized food material 25 is forced. Depending on the machine design, the feed aperture 28 may be located as illustrated to supply food material 25 to the center portion of the ultimately formed patty 35 or may alternatively be located to supply the food material 25 to a region at or near the periphery of the patty 35.

The food material 25 is moved or conveyed forward in the chamber 24 and upwardly through the aperture 28 by a mechanism capable of pressurizing the material 25 within the chamber or reservoir 24. Though such a mechanism is not illustrated in the present disclosure, any number of suitable conventional mechanisms may be employed. An example of one such suitable mechanism is that disclosed and illustrated in the U.S. Pat. No. 3,293,688. In the above-discussed Hollymatic 500 and Hollymatic 580 molding machines, the pressurizing mechanism comprises a reciprocating compression blade and pin plate of conventional design known to those skilled in the art and generally described in the above-discussed U.S. Pat. Nos. 4,272,864 and 4,338,702. However, any suitable feed mechanism may be used with the molding machine 20 and subassembly 60. The specific feed mechanism construction per se forms no part of the present invention.

A mold plate 30 is slidably disposed on top of the food material reservoir cover plate 26. The mold plate 30 has a mold opening 32 which defines at least a peripheral portion of a mold cavity having the shape of the patty 35 that is to be ultimately molded. The mold plate 30 is adapted to be moved between a patty molding position wherein the mold opening 32 receives the pressurized food material 25 (as illustrated in FIG. 1) and a patty ejecting position (to the left of the mold plate position illustrated in FIG. 1) wherein the mold opening 32 is spaced away from the patty molding position and is generally exposed to permit ejection of the molded patty 35 from the mold plate 30.

Typically, the formed patty 35 is automatically ejected from the mold plate 30 by a suitable patty ejecting mechanism represented generally by reference numeral 38. The patty ejecting mechanism 38 may be of any suitable conventional type and may include a disc-like or cup-like member 40 mounted to a drive rod 42. The ejecting mechanism 38 is timed to intermittently reciprocate in the vertical direction to eject the formed patty 35 when the mold plate 30 periodically moves a molded patty 35 into the patty ejecting position. The construction and operation of the patty ejecting mechanism 38 per se forms no part of the present invention.

An upper guide plate 50 is fixed to the cover plate 26 at a spaced location therefrom so that the plates 50 and 26 together define a guideway between which the mold plate 30 is disposed and along which the mold plate 30 is reciprocated. As best illustrated in FIG. 1, the cover plate 26, the upper guide plate 50, and the mold plate 30 all function together as mold parts defining the mold cavity. Specifically, the cover plate 26 defines a portion of the bottom of the mold cavity, the mold plate 30 defines the peripheral or vertical side portion of the mold cavity, and the upper guide plate 50 defines the top surface of the mold cavity.

Plastic food material, which may be meat that has been chopped, ground, or otherwise reduced to relatively small pieces, can be conveniently formed into a patty with the general type of machine 20 illustrated in FIG. 1. However, for the various reasons set forth in the above-discussed U.S. Pat. Nos. 4,272,864 and 4,338,702, such a patty, if made from ground beef, can have a number of undesirable characteristics. Specifically, such a patty may have many of the tissue fibers oriented and aligned in generally parallel lines. The aligned tissue fibers contract during the cooking process and cause a shrinkage of the patty in the alignment direction.

Further, patties made with such conventional apparatus are not as porous as would be desired. Such a patty, being more dense than desired, has less of a capability for entrapping air and retaining cooking juices. Consequently, the cooked patty does not have the degree of porosity and juiciness that would be desired.

Formation of a patty with a foraminous member according to the general principles of the above-discussed U.S. Pat. Nos. 4,272,864 and 4,338,702 can provide an improved patty that does not suffer from the above-described deficiencies. Moreover, it has now been determined that (1) the patty can be even further improved with respect to strength and shape as described hereinafter and (2) a less complex assembly can be provided which enables conventional machines to form such an improved patty.

To this end, a conventional patty forming machine 20 of the type generally illustrated in FIG. 1 may be readily converted, according to the principles described hereinafter, to an improved machine. Such an improved machine effects the formation of the an improved patty with the use of a foraminous member according to a novel process disclosed herein and may also include novel features for reducing the tendency of the foraminous member to plug up with tissue fibers.

FIRST EMBODIMENT

Figure 2:
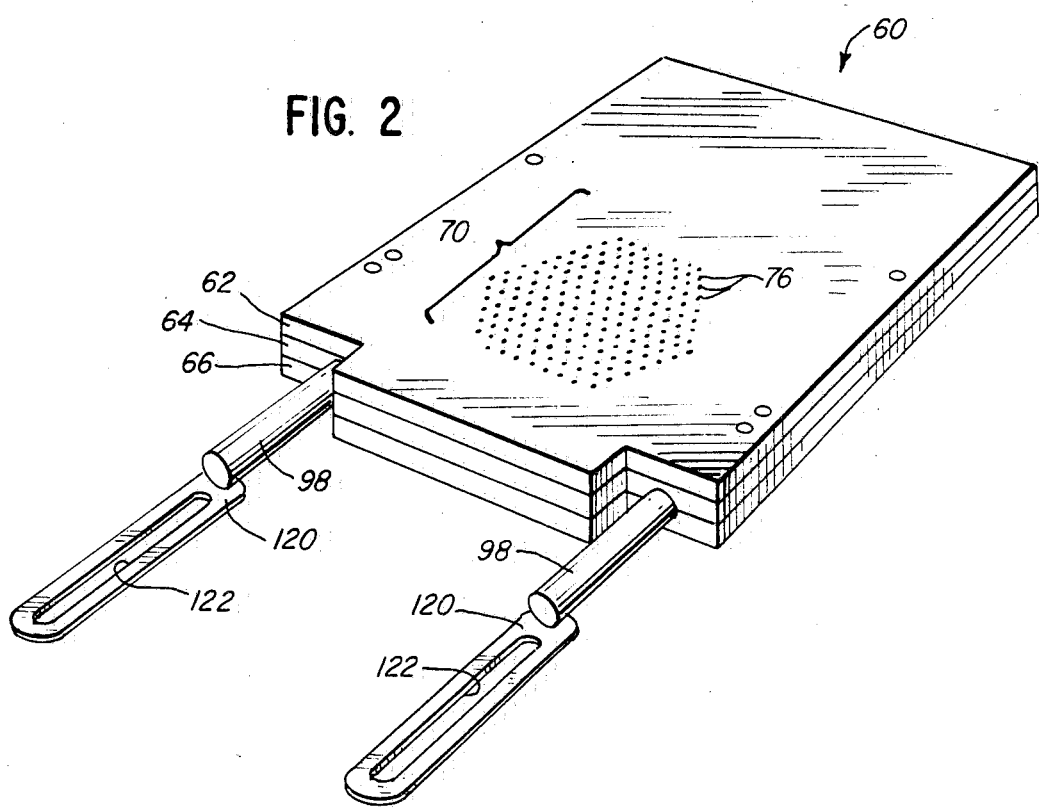
FIG. 2 is a top, perspective view of a subassembly apparatus for converting the machine illustrated in FIG. 1 to an improved patty molding apparatus.
Figure 6:
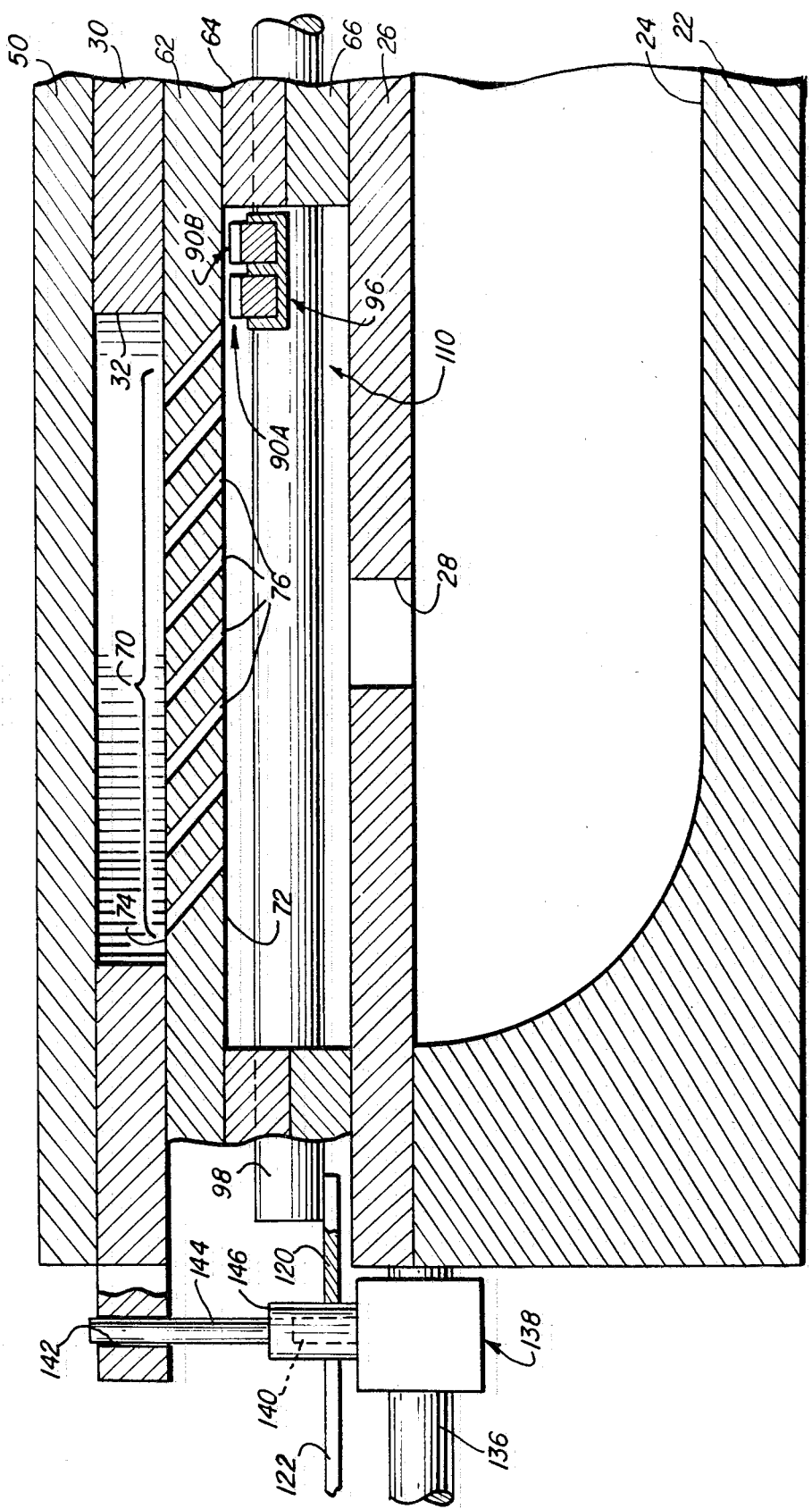
FIG. 6 is an enlarged, fragmentary, cross-sectional view similar to FIG. 1, but showing the subassembly of FIG. 3 mounted in the machine of FIG. 1 with the machine's mold plate being illustrated in the patty molding position.

The first embodiment of the subassembly 60 illustrated in FIG. 2 may be conveniently used for the above-described modification of a conventional molding machine. The subassembly 60 includes a top plate or foraminous member 62 and underlying plates 64 and 66. The bottom underlying plate 66 is adapted to be disposed on top of the cover plate 26 of the machine 20 as best illustrated in FIG. 6.

The upper plate or member 62 is a foraminous member defining a foraminous region 70 which may be a separate insert or which may be formed integrally with the plate 62 as illustrated. In any case, the bottom of the foraminous member 62 defines an upstream side 72 (FIG. 6), which may be a generally flat and planar surface as illustrated, and the top of the member 62 defines a downstream side 74 (FIGS. 3 and 6).

Figure 3:
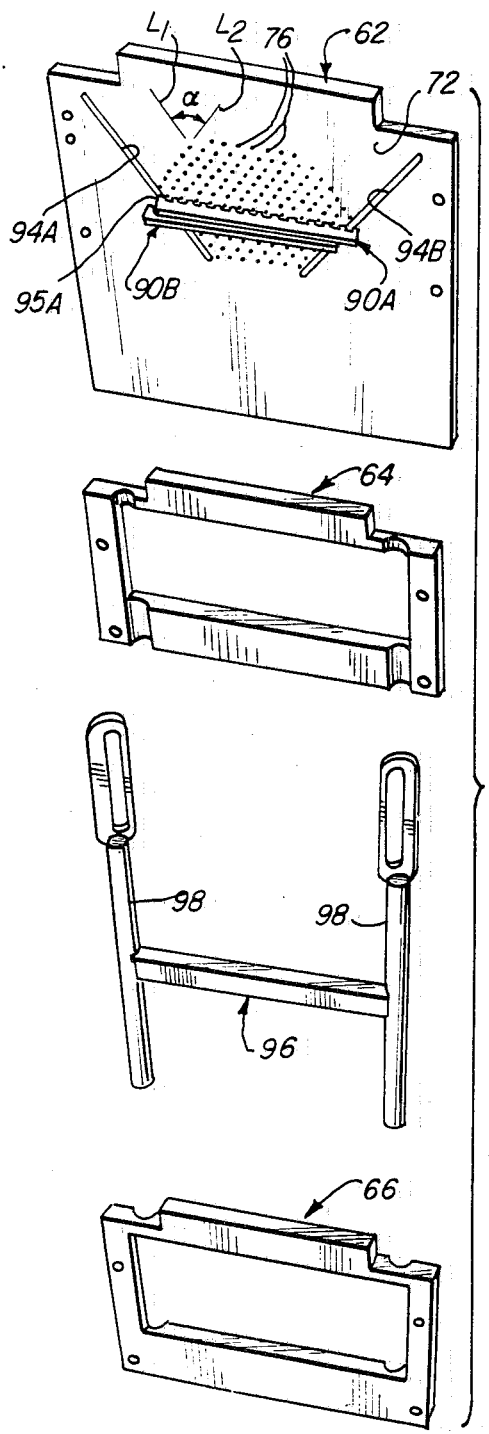
FIG. 3 is an exploded, bottom, perspective view of the subassembly apparatus of FIG. 2.

As best illustrated in FIGS. 2 and 3, the foraminous member 62 has a plurality of apertures 76 extending through the foraminous member between the upstream side 72 and the downstream side 74. The apertures 76 define an array of openings at the upstream side 72 which are preferably, though not necessarily, arranged in a first set of spaced-apart parallel rows and in a second set of space-apart parallel rows. The rows of aperture openings of the first set are oriented at an acute angle relative to the rows of the second set. This is illustrated in FIG. 3 wherein a line $L_1$ has been drawn through a row of the first set of spaced-apart parallel rows of openings and wherein a line $L_2$ has been drawn through a row of the a second set of spaced-apart parallel rows of openings. In the preferred embodiment, the angle alpha between the two lines $L_1$ and $L_2$ is an acute angle (e.g., about 60 degrees).

Figure 4:
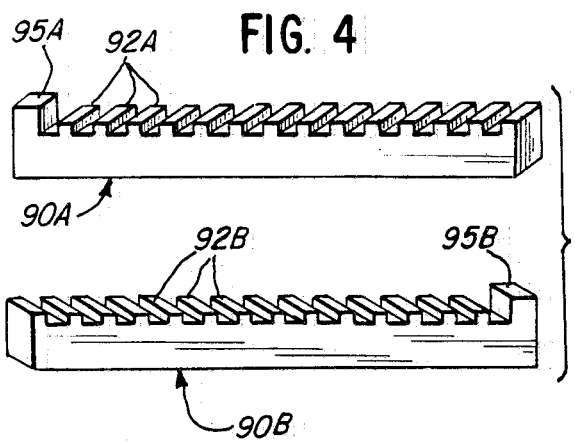
FIG. 4 is a perspective view of each of the two agitator bars of the subassembly apparatus shown in FIG. 3.

In the first embodiment of the subassembly illustrated in FIG. 3, at least two agitator bars 90A and 90B are disposed adjacent the upstream side 72 of the foraminous member 62 for reciprocative movement along the upstream side 72. As best illustrated in FIGS. 3 and 4, the agitator bar 90A includes a plurality of spaced-apart, angled, teeth 92A oriented with at least one tooth 92A between two adjacent rows of the first set of parallel rows of openings defined in the upstream side 72 by the apertures 76. The other of the agitator bars, bar 90B, similarily includes a plurality of spaced-apart, angled teeth 92B oriented with at least one tooth 92B between two adjacent rows of the second set of parallel rows of openings defined in the upstream side 72 by the apertures 76.

A novel construction is provided for guiding the agitator bars 90A and 90B in the desired paths of movement relative to the foraminous member 62. Specifically, the foraminous member upstream side 72 two straight guide slots, guide slot 94A and 94B. The guide slots 94A and 94B are oriented at an angle to each other which is equal to the angle alpha discussed above. Thus, guide slot 94A is parallel to the first set of parallel rows of openings defined in the upstream side 72 by the apertures 76. Similarily, guide slot 94B is parallel to the second set of parallel rows of openings defined in the upstream side 72 by the apertures 76.

The agitator bar 90A has a projecting guide member 95A for being received in the guide slot 94A. Similarly, the agitator bar 90B has a projecting guide member 95B for being received in the guide slot 94B. Thus, each guide slot will function to define the locus of motion of its associated agitator bar. That locus of motion lies at an angle relative to the locus of motion of the reciprocating mold plate 30 (e.g., if angle alpha is about 60 degrees, then the relative angle between these loci of motion would be about 30 degrees).

The agitator bars 90A and 90B are supported and maintained in a plane that is generally parallel to the plane of movement of mold plate 30. This support is provided by a support frame 96 which comprises two channel-like trays 97A and 97B (FIG. 5) that are connected between two drive rods 98. The drive rods 98 are slidably mounted in the plates 64 and 66 as illustrated in FIGS. 2 and 6.

Figure 5:
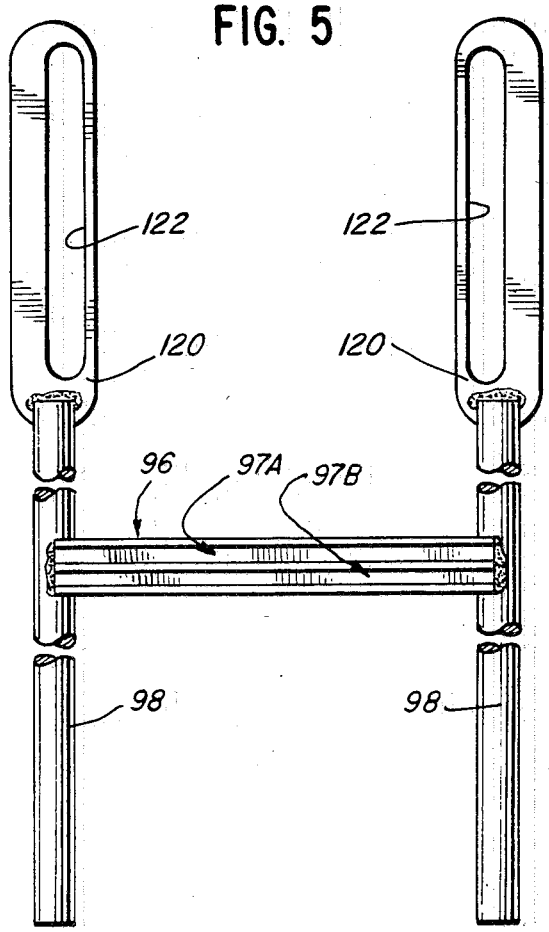
FIG. 5 is a top plan view of the agitator bar receiving trays connected to a pair of guide rods as employed in the subassembly apparatus illustrated in FIG. 3.

As best illustrated in FIGS. 5 and 6, each tray 97A and 97B defines a straight channel opening toward the upstream side 72 of the foraminous member 62 with the length of the channel oriented normal to the straight line locus of motion of the mold plate 30. The channel defined by each tray 97A and 97B is sized to receive one of the agitator bars 90A and 90B, respectively, in a sliding relationship. The channel in each tray 97A and 97B is longer than the length of the associated agitator bar 90A or 90B so as to accommodate side-to-side reciprocative movement of the agitator bar.

In the first embodiment illustrated, as well as in the other embodiments, the foraminous member apertures 76 may be drilled in the foraminous member 62 to form generally cylindrical surfaces or bores. Bores with a diameter between about 2.4 mm. and about 3.6 mm. and with a centerline spacing of about 9.5 mm. have been found to function well when preparing patties of raw ground beef. If desired, each aperture 76 may have an enlarged counterbore (not illustrated) that opens to the upstream side 72 of the member 62. Each aperture 76 may also have a non-circular cross section which may vary in size and shape along the length of the aperture.

As can be best seen in FIGS. 6 and 7, the bores or aperture 76 are preferably drilled at an angle with respect to the foraminous member surfaces 72 and 74. The apertures 76 are illustrated as being disposed at an angle with respect to the surfaces 72 and 74 of about 45 degrees. An angle of about 26 degrees has also been found to work well. However, the present invention contemplates that other orientations may be used.

For example, not all of the apertures (bores) 76 need be oriented as illustrated at the same, uniform angle with the axes of all of the apertures (bores) 76 lying in parallel planes. Some apertures (bores) 76 may be oriented with their longitudinal axes skewed in other directions and at other angles.

Indeed, all or some of the apertures 76 may be vertically oriented (i.e., not inclined with respect to the foraminous member surfaces 72 and 74). However, it has been determined that a more improved patty results when not all of the apertures 76 are vertically oriented.

The apertures need not necessarily have the shape of a cylinder or prism. Instead, one or more apertures may have a corkscrew or other shape which would guide the food material in a non-linear path through the foraminous member 62. As described in detail hereinafter, the use of non-vertical apertures 76, regardless of cross-section configuration, can result in an improved molded patty having characteristics found to be highly desirable, especially when the patty is molded from raw ground meat which is intended for subsequent cooking. The term "non-vertical aperture" as used herein means an aperture having at least a portion of the aperture that is adjacent the mold opening 32 oriented so as discharge the food material into the mold opening 32 in a direction that is not perpendicular to the plane of the mold opening (i.e., the plane of movement of the mold plate 30.)

As illustrated in FIGS. 6 and 7, the plates 64 and 66 define an interior chamber 110 on the upstream side of the foraminous member 62. The agitator bars 90A and 90B, the frame 96, and portions of the drive rods 98 are received within this chamber 110. The drive rods 98 are slidably received at the ends of the chamber 110 between the plates 64 and 66.

The drive rods 98 are reciprocated by a novel connection with the conventional mechanism employed for reciprocating the mold plate 30. Specifically, in the above-discussed Hollymatic 500 and Hollymatic 580 machines, the mold plate is reciprocated by a shuttle mechanism which includes a pair of shuttle bars 136 (FIGS. 6-8). One shuttle bar 136 is located along one side of the machine and other shuttle bar 136 being located along the other side of the machine. A shuttle assembly 138 is slidably disposed on the shuttle bars 136. The shuttle assembly 138 is connected to a suitable linkage system (not illustrated) driven by a suitable conventional mechanism (not illustrated) for reciprocating the shuttle assembly 138 at the desired frequency and stroke length along the shuttle bars 136.

The shuttle assembly 138 includes a drive pin 140 which, in the conventional (and unmodified) Hollymatic 500 and 580 machines, is received in a bore 142 (FIG. 6) in the overlying mold plate 30. When the Hollymatic 500 and 580 machines are modified to accommodate the novel subassembly apparatus 60 discussed above, the existing pin 140 serves as a means for mounting a longer pin 144. Specifically, the longer pin 144 includes an enlarged base member 146 (FIG. 6) with an aperture in which is received the pin 140. The longer pin 144 then projects upwardly into the bore 142 of the mold plate 30.

Each pin base member 146 is adapted to be engaged with a forward end 120 of a drive rod 98 (FIGS. 2, 6, and 7). The forward end 120 of each drive rod 98 defines an elongate slot 122 in which the base member 146 is slidably received.

The Hollymatic 500 and 580 machines have a mold plate stroke length of about 20.32 cm. When the novel subassembly 60 is incorporated in such Hollymatic machines, the elongate slot 122 in the end 120 of each agitator bar drive rod 98 is about 10.16 cm. in length. The relationship between mold plate stroke length and the length of each drive rod slot 122 thus permits a lost motion action to occur.

Specifically, when the mold plate 30 is initially moved from the extended, patty ejecting position (FIG. 7) toward the patty molding position (FIG. 6), the pin base member 146 does not engage the end of the slot 122 (the right-hand end) until a predetermined amount of mold plate movement has occurred (about 10.16 cm. in the Hollymatic 500 and 580 machines).

Similarly, when the mold plate 30 is initially moved from the patty molding position (FIG. 6) to the patty ejecting position (FIG. 7), the pin base member 146 does not engage the other end of the slot 122 (the left-hand end) until the mold plate 30 has moved away from the patty molding position a predetermined amount (about 10.16 cm. Hollymatic 500 and 580 machines).

If the novel subassembly 60 described above is incorporated in patty molding machines other than the Hollymatic 500 and 580 machines discussed above, then the mechanism for reciprocating the agitator bar drive rods 98 will, of course, be modified somewhat from that illustrated. Preferably, however, the agitator bar drive rods 98 will be connected, via a suitable lost motion linkage, to the mechanism for reciprocating the mold plate. Of course, the agitator bar drive rods 98 could be reciprocated by means independent of the means for reciprocating the mold plate.

In any case, the drive rods 98 are reciprocated in the directions parallel to the directions of reciprocation of the mold plate 30. However, owing to the angled orientation of the guide slots 94A and 94B in the foraminous member 62 and owing to the agitator bar members 95A and 95B received therein, it is not possible for the agitator bars 90A and 90B to be moved in a straight line path parallel to the straight line path of reciprocation of the drive rods 98 and mold plate 30. The agitator bar members 95A and 95B, and hence the bars, must necessarily follow the angled paths defined by the guide slots 94A and 94B.

Movement of the frame 96 causes the agitator bars 90A and 90B to be driven along the foraminous member upstream side 72. As the frame 96 is moved along the cavity 110 by the drive rods 98, the agitator bars 90A and 90B are each also displaced in a direction perpendicular to the straight line path of movement of the drive rods 98 and mold plate 30. This movement is accommodated by the elongate channels of the frame trays 97A and 97B which permit the agitator bars to slide transversely in the trays across the foraminous member upstream side 72 in directions perpendicular to the straight line path of movement of the mold plate 30. As a result, the agitator bar 90A moves along a path parallel to the guide slot 94A and parallel to the first set of parallel rows of openings defined in the upstream side 72 by the apertures 76. Similarily, the agitator bar 90B moves along a path parallel to the guide slot 94B and parallel to the second set of parallel rows of openings defined in the upstream side 72 by the apertures 76.

Between each pair of adjacent rows of aperture openings there is a tooth of one of the agitator bars. Thus, each such tooth moves along a path that is parallel to, and between, two rows of aperture openings so as to at least agitate the tissue fibers in a manner explained in more detail hereinafter. Most of the apertures 76 will each be subjected to the sweeping or agitating motion of a pair of spaced-apart teeth 92A of bar 90A on opposite sides of the aperture. Most of the apertures 76 will be similarly subjected to the sweeping or agitating motion of a pair of spaced-apart teeth 92B of bar 90B on the other two sides. With the bar 90A moving forward along a path at an angle of 60° relative to path of movement of the bar 90B, each aperture 76 will circumscribed by four straight line paths of travel of the four teeth, and the circumscribing paths will define a parallelogram or rhombus around the aperture. Thus the sweeping or agitating action of the teeth is effected around the entire periphery of the aperture.

In the embodiment shown in FIGS. 1–6, the agitator bars 90A and 90B are each spaced slightly away from the foraminous member upstream side 72. However, in many instances each agitator bar may be advantageously positioned in direct contact with the foraminous member upstream side 72. This may be effected with a substantially "zero" clearance construction or by actually biasing the bars 90A and 90B to urge the teeth into direct contact with the upstream side 72 of the foraminous member 62. This is described in detail hereinafter with reference to alternate embodiments of the agitator bar illustrated in FIGS. 11–14.

In operation, the mold plate 30 is moved to the patty molding position (FIG. 6) so as to dispose the mold opening 32 adjacent the downstream side 74 of the foraminous member 62. In this position the agitator bars 90A and 90B are each at one end of their path of movement (the right-hand end of the chamber 110 as illustrated in FIG. 6).

During the time that the mold plate 30 is moved from the patty ejecting position to the patty molding position illustrated in FIG. 6, the food material is pressurized and is forced through the aperture 28 of the cover plate 26 and into the chamber 110. Initially, when the solid end portion of the mold plate 30 (the right-hand end portion of the mold plate as illustrated in FIG. 6) is moving over the foraminous member 62, the food material fills the apertures 76 of the foraminous member 62 and is compressed therein against the overlying mold plate 30 which is sliding therepast.

However, as the mold opening 32 begins to move over the foraminous member 62, the food material begins to be forced into the mold opening 32 (initially at the left-hand portion of the foraminous region 70 as viewed in FIG. 6). The food material is discharged under pressure into the mold opening 32 as the leading edge of the mold opening 32 continues to uncover more apertures 76. Finally, when the mold plate 30 has been moved to the fully retracted (patty molding) position illustrated in FIG. 6, the maximum number of foraminous member apertures 76 have been uncovered and these apertures 76 function to admit pressurized food material into the entire mold opening 32 for completion of the patty molding step. (If desired, the food material pressurizing mechanism (not illustrated) may by only periodically operated so as to effect pressurization of the food material only when some or all of the apertures 76 are uncovered.)

As the pressurized food material flows though the apertures 76 of the foraminous member 62 into the mold opening 32, discrete extrudate masses of material 160 (FIG. 7) are formed within, or by, the apertures 76. Because of the inclination of the apertures 76, the extrudate masses 160 enter the mold opening with an upward component of movement, as well as with a component of movement lengthwise of the mold plate 30.

As a mass 160 enters the mold opening 32, there may be some amount of circumferential expansion of each extrudate mass 160. Further, the extrudate masses 160 may not all maintain the same direction of movement once they have entered the mold opening 32. Depending on, inter alia, (1) the spacing between the apertures 76, (2) the shape and size of each aperture 76, (3) the orientation of each aperture 76, and (4) the pressure with which the food material is forced though the apertures 76, the extrudate masses 160 in the mold opening 32 will assume various degrees of relative non-alignment and random orientation. Indeed, the extrudate masses 160 become interwoven or knitted together. This functions to increase the strength of the patty 35. The patty 35 will have less of a tendency to break or fall apart before, during, and after cooking.

Such interweaving may be further aided by the interaction between the extrudate masses 160 and the air pressure in the mold opening 32. As the extrudate masses enter the mold opening 32, the air in the mold opening is necessarily compressed in a continuously decreasing volume. Although conventional means are typically provided for relieving the resulting increased pressure in the mold opening, the increased transient air pressure may provide some resistance to the incoming flow of food material which may further deflect the extrudate masses and enhance the interweaving effect.

Portions of the masses 160 also ultimately turn in different directions as they impinge upon the mold cavity surfaces. The mold cavity surfaces are defined by (1) the upper plate 50, (2) the vertical side walls of the mold plate 30 defining the mold cavity 32, and (3) the portions of the downstream surface 74 of the foraminous member 62 which lay between the apertures 76.

Owing to the twisting, turning, and interweaving of the extrudate masses 160 in the mold cavity 32, the extrudate masses 160 form a patty which contains a significant amount of voids or air spaces and which has a relatively high degree of porosity. Compressed air trapped in the void spaces may also cause some desirable expansion of the patty after it is ejected from the mold—thus contributing to the formation of an even less dense patty.

The type of patty described above, wherein the extrudate masses 160 are interweaved to form a porous patty, has been satisfactorily molded with the apparatus of the present invention employing a oraminous member 62 having a thickness of about 9.5 mm. The apertures 76 were cylindrical bores angled at about 26 degrees in parallel planes and each aperture 76 had a diameter of about 3 mm. The distance between center lines of adjacent apertures 76 in each row was about 9.5 mm. The mold opening 32 was about 101.6 mm and the thickness of the mold plate 30 was about 19.1 mm.

If most of the inclined apertures 76 are angled in the same direction and are relatively close together in relation to the size of each aperture, some portion of the extrudate masses 160 entering the mold opening 32 will each tend to be generally oriented, at least for a portion of their length, at an angle in the mold opening 32. Once they are free of the constraint of the walls of apertures 76, the discrete masses of material 160 may expand circumferentially somewhat and surface portions of adjacent masses will ultimately come into contact. Portions of the masses 160 will also ultimately impinge at an angle upon the mold cavity surface defined by the upper plate 50 and will be deflected downwardly by such surface and will flow toward th left-hand side of cavity 32, as viewed in FIG. 1.

As the mold opening is filled, more pressure is applied to the left and right peripheral edges of the mold opening (as viewed in FIG. 6) than to the sides thereof due to the application of the molding pressure through the inclined apertures 76. As a result, assuming that the mold opening 32 is circular, when the patty 35 is ejected from the mold opening (compare FIG. 16 to FIG. 17) the stored-up pressure will cause the patty to expand in the direction (P' in FIG. 17) in which pressure is greater. This will produce an elongated patty 35a.

It has been found that for a patty that is nominally 4" in diameter (dimension "P" in FIG. 18), the patty will expand after ejection from the mold opening to about $4\frac{1}{4}$" to 4 3/16" (dimension P' in FIG. 17). The patty in the perpendicular dimension (P" in FIG. 17) may contract somewhat when the patty is ejected from the mold opening, but this dimension will be essentially the same as the diameter of the mold opening.

It will be readily appreciated that because of the expansion of the patty 35a after ejection from the mold opening, an extremely porous product is produced. Such a product may be cooked more quickly, and as a result may retain more of the natural juices thereby providing enhanced flavor and texture. Also, for reasons explained hereinafter, the elongated patty 35a formed from meat containing tissue fibers will tend to cook into a circular shape as shown in FIG. 18 (for the "cooked" patty 35b) if a shear layer is formed across one or both sides of the patty as described hereinafter.

The discrete masses of food material 160 passing into the mold cavity through closely spaced, inclined apertures 76 may also curl in a lengthwise direction, moving under one another, so that a shingled interweaving of the extrudate masses is produced, as is shown in FIGS. 19 and 20. In any case, the food material is eventually forced through the foraminous member 62 so that the discrete extrudate masses 160 in the mold cavity above the foraminous member 62 together define a packed array forming the patty 35. Voids or air spaces exist between the packed extrudate masses 160 in the patty 35 to give the patty a relatively high degree of porosity even as compared to the greatly improved patties produced in accordance with the teachings of U.S. Pat. Nos. 4,272,864 and 4,338,702. The resulting patty has a grinder-like texture, a result which has heretofore not been possible for a thin patty.

It is to be realized that the illustrations of the patty in FIGS. 19 and 20 are greatly simplified and that the alignment configuration of the extrudate masses 160 is exaggerated for descriptive purposes. It is also to be realized that the shingled interweaving structure illustrated for the patty in FIGS. 19 and 20 can be altered by, among other things, changing the spacing between the foraminous member apertures 76.

In addition, if the apertures 76 are not all inclined in the same direction, the intertwining character of the extrudate mass structure can be considerably altered. Depending upon the precise shape of each aperture, the orientation of each aperture, the spacing between the apertures, the size of each aperture, the size of the mold opening, and the pressure at which food material is forced through the foraminous member, a different, and in some cases, increased interweaving or intertwining structure can be produced. A patty with increased interweaving could have little or none of the "shingled" structure illustrated in FIGS. 19 and 20.

Of course, with a patty that does not have extrudate masses 160 in a substantially angled configuration as illustrated in FIGS. 26 and 27, there may be substantially less stored-up pressure in the patty, and there will be substantially less or no unidirectional elongation of the patty when it is ejected from the mold opening. However, depending upon the food material injection pressure, upon relative spacing between the apertures, and upon the size of the mold opening, such a patty may have stored-up pressure which will cause the patty to expand somewhat in generally all peripheral directions after the patty is ejected from the mold opening.

In any case, it has been found that the formation of a patty with food material extruded through "non-vertical apertures" will produce an improved molded patty having a desirable void structure for retaining cooking juices and having increased structural strength so that the patty has less of a tendency to break apart before, during, and after cooking.

During the process of forcing the food material against and through the foraminous member 62, there may be an initial tendency for some of the apertures 76 to become partially plugged with tissue fibers or other pieces of food material. For example, some tissue fibers and other pieces of food material may initially extend across the upstream side of the foraminous member 62 between adjacent apertures 76 in a row of apertures. However, as will next be explained in detail, these fibers are agitated by the moving agitator bars 90A and 90B. This prevents an accummulation of tissue fibers on the foraminous member upstream side 72 that might otherwise eventually plug up the apparatus.

When the machine drive pins 144 first move to drive the mold plate 30 to the patty molding position (FIG. 4), the drive rods 98 are not initially engaged by the pins base members 146. After some predetermined initial movement of the mold plate 30 away from the patty ejecting position, the base members 146 push the drive rods 98 inwardly (to the right as viewed in FIG. 6). This causes the agitator bars 90A and 90B to sweep across the upstream side of the foraminous member. As the agitator bars 90A and 90B sweep across the upstream side of the foraminous member 62, the tissue fibers are sufficiently agitated that many become dislodged and oriented in other positions. Many of the tissue fibers become oriented in a way that permits them to pass through the apertures 76.

After the mold opening 32 is filled, the mold plate 30 begins to move back to the patty ejecting position (FIG. 7). After a predetermined initial movement of the mold plate 30, the agitator bars 90A and 90B again to sweep across the upstream side 72 of the foraminous member 62 (to the left as viewed in FIG. 7). When the mold plate 30 reaches the patty ejecting position (FIG. 7), the agitator bars 90A and 90B are also at the end of their return strokes and the patty 35 is ejected.

Not all of the tissue fibers that may be lodged on the upstream side of the foraminous member 62 will necessarily be dislodged by one sweep of the agitator bars 90A and 90B across the foraminous member 62. However, each stroke of the agitator bars 90A and 90B with the mold plate 30 provides additional agitation which dislodges tissue fibers. Indeed, the periodic reciprocation of the agitator bars 90A and 90B across the foraminous member 62 with each molding cycle functions to continuously effect a dislodging of the tissue fibers. A tissue fiber that does not get dislodged during one sweep of the bars 90A and 90B will ultimately get dislodged during one of the subsequent sweeps of the agitator bars.

In the embodiment illustrated in FIGS. 2-7, the teeth 92A and 92B of the agitator bars 90A and 90B, respectively, do not contact or slide against the foraminous member 62. However, it has been found that under certain operating conditions and with certain types of food material, including raw ground meat, it is desirable for the teeth 92A and 92B to be in sliding contact with the upstream side 72 of the foraminous member. This can be accomplished by constructing the subassembly 60 so that there is substantially no clearance between the agitator bar teeth and the foraminous member 62 or by specifically biasing the agitator bars against the foraminous member upstream side 72. This provides an improved action with respect to preventing tissue fiber build-up on the foraminous member upstream side 72. Means for biasing the agitator bar teeth against the foraminous member are described in detail hereinafter with respect to the modified embodiments illustrated FIGS. 11-14.

As pointed out in the above-discussed U.S. Pat. Nos. 4,272,864 and 4,338,702, it is desirable in many cases to provide a patty having a shear layer of somewhat dense food material on one or both of the top and bottom surfaces of the patty. The layer of dense food material is preferably about 0.4 mm. thick, although a shear layer of a greater or lesser thickness may be provided. Preferably, the shear layer is thick enough to aid in holding the formed patty together and to reduce the tendency of the patty to break apart during handling prior to, during, and after cooking. It is believed that such a layer also functions to trap the air and vapors in the interstitial voids below the layer during cooking to thereby promote more rapid and more uniform cooking of the patty and to thereby aid in retention of the cooking juices.

The above-described shear layer on one or both of the top and bottom surfaces of the patty can be formed with the apparatus of the present invention (but the thin shear layer is not visible in the patty 35 in FIG. 7). This is effected by providing a certain amount of clearance between the top surface of the mold plate 30 and the bottom surface of the upper plate 50 and/or between the bottom surface of the mold plate 30 and the top surface of the cover plate 26. If the clearance between the mold plate and the overlying or underlying plate is sufficient, then the plastic food material trapped within this clearance region in the mold area will be subject to frictional forces when the mold plate is moved from the patty molding position to the patty ejecting position.

As the mold plate is so moved, the plastic food material in the clearance region is forced against the surface of the formed patty. In order to insure that the shear layer is properly formed and possesses sufficient structural integrity, the inventors of the present invention have determined that it is desirable to arrange the rows of apertures 76 at a common angle skewed relative to the straight line path of motion of the reciprocating mold plate 30. As illustrated in FIG. 3, the angle (equal to one-half of angle alpha) may be about 30 degrees. However, the angle need not be particularly large and an angle of about 10 degrees has been found to be satisfactory in producing a shear layer.

When the rows of apertures 76 are aligned at an angle, portions of the extrudate masses of food material being forced out of the apertures 76 are contacted at the top and bottom of the mold opening 32 by the overlying upper plate 50 and by the underlying plate 26, respectively. Movement of the mold plate 30 effects a frictional engagement of these extrudate masses. This forces and deforms some of the food material from each discrete mass in a direction generally parallel to the direction of movement of the mold plate 30. This tends to cause the deformed food material to be carried across the patty surface to thereby effect a further linking of the extrudate masses of material.

Although the above-described shear layer functions to trap additional air and vapors in the interstitial voids of the patty and functions to provide further patty strength (which reduces the tendancy of the patty to break apart), the shear layer L has a characteristic which is undesirable in some situations. Specifically, in a patty made from ground meat containing tissue fibers, the shear layer tends to shrink non-uniformly when the patty is cooked. When a patty of food material containing tissue fibers is molded with a shear layer according to the above-described method, the tissue fibers, which are generally randomly distributed in ground meat material, tend to become unravelled and tend to become aligned in the surface of the shear layer. This is due to the frictional forces acting on the shear layer as the mold plate 30 moves relative to the adjacent fixed plates in the molding machine.

Thus, if a substantially round patty were produced with such a shear layer, the tissues would be aligned in the surface of the shear layer of that patty in a generally parallel configuration. When the patty is cooked, the tissue fibers contract in the cooking process and cause a shrinkage of the round patty in a direction of tissue fiber alignment. The patty thus becomes somewhat oval after cooking.

To avoid this problem, a patty formed with a shear layer L may be initially formed with a slightly elongated shape in the manner described above with reference to FIGS. 16–20 for the patty 35a. Since the patty 35a is moved by the mold plate 30 in a direction parallel to the stored-up forces in the patty, the patty will elongate (FIG. 17) in the same direction as the tissue fiber alignment when the patty is ejected from the mold opening 32.

Then, when the patty is cooked, the tissue fibers will contract and produce a patty that has an essentially round or circular shape (FIG. 18). This feature is of aesthetic importance, especially in restaurants where the consuming public seems to prefer a generally circular cooked patty over a non-circular patty, at least with hamburger-type food products.

SECOND EMBODIMENT

The first embodiment of the subassembly 60 illustrated in FIGS. 2–7 may be modified to form a second embodiment for use in a conventional molding machine. The components of the second embodiment illustrated in FIGS. 8–10 are identical to the components of the first embodiment of the subassembly 60 except for the second embodiment foraminous member which is designated by the reference numeral 62′ and except for the associated second embodiment agitator bars which are designed by the reference numerals 90A′ and 90B′.

The foraminous member 62′ has a generally flat, planar upstream surface 72′ with an array of openings defined in the upstream side of the foraminous member 62 by the apertures 76′. The openings of the aperture 76′ at the upstream side 72′ are arranged in a first set of spaced-apart parallel rows and in a second set of spaced-apart parallel rows in the same manner as the apertures 76 in the first embodiment of the foraminous member 62 described in detail above with reference to FIGS. 2–7.

The foraminous member 62′ is also provided with a pair of guide slots 94A′ and 94B′. One of the guide slots is parallel to the first set of parallel rows of foraminous member aperture openings and the other of the guide slots is parallel to the second set of parallel rows of foraminous member aperture openings. A projecting member 95A′ of the agitator bar 90A′ is received in the guide slot 94A′ and a projecting member 95B′ of the agitator bar 90B′ is received in the guide slot 94B′.

Unlike in the first embodiment of the foraminous member 62 described above with reference to FIGS. 2–7, the second embodiment of the foraminous member 62′ is not flat and smooth between the rows of apertures 76′. Rather, as best illustrated in FIGS. 9 and 10, the foraminous member 62′ defines a plurality of spaced-apart, parallel channels 201′ and a plurality of spaced-apart, parallel channels 203′ which are oriented at an angle to the channels 201′. Each channel 201′ is located parallel to and between a pair of adjacent rows of the aperture openings of the first set of rows and receives a tooth 92A′ of the agitator bar 90A′. Similarily, each channel 203′ is located parallel to and between a pair of adjacent rows of the aperture openings of the second set of rows and receives a tooth 92B′ of the agitator bar 90B′.

Although the agitator bar 90A′ is shown in FIG. 10 as not being in contact with the foraminous member 62′, it is to be realized that contact may be established between the tops of the agitator bar teeth 92A′ and the bottom of the channels 201′ and/or between the upstream surface 72′ of the foraminous member and the portions of the bar 90A′ between the teeth 92A′. Indeed, it has been determined that a biasing of the agitator bar 90A′, as well as bar 90B′, against the foraminous member 62′ is preferred when molding some types of food material, such as raw ground beef, since a more efficient tissue fiber dislodging action can be effected. Means for biasing an agitating bar against a foraminous member are described in detail hereinafter with reference to the modified embodiments illustrated in FIGS. 11 and 14.

The foraminous member 62′ is adapted to be assembled with the agitator bars 90A′ and 90B′, and with the other components of the subassembly (plates 64, rods 98, tray 96, and plate 66 which are in FIGS. 2 and 3). The entire subassembly can be mounted in a molding machine, such as molding machine 20, in the same manner as a first embodiment of the subassembly 60 described above with reference to FIGS. 6 and 7. The mechanical operation of the components of the subassembly with the second embodiment of the foraminous member 62′ and bars 90A′ and 90B′ is substantially identical and functionally analogous to the operation of the components of the first embodiment of the subassembly 60 described above with reference to FIGS. 2–7.

THIRD EMBODIMENT

Figure 11:
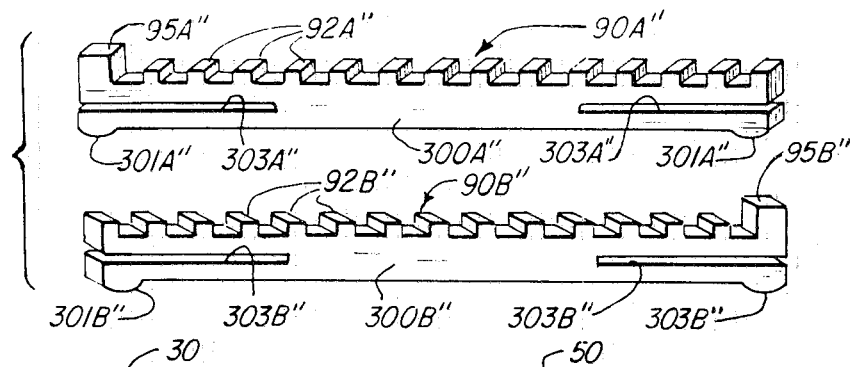
FIG. 11 is a perspective view of a modified form of the two agitator bars which can be used in the subassembly apparatus as a third embodiment.
Figure 12:
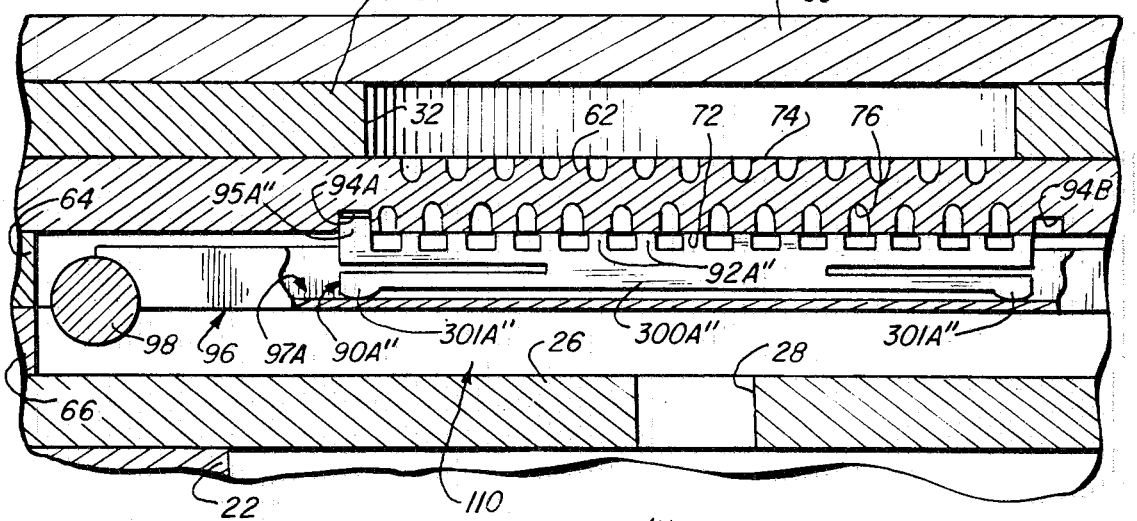
FIG. 12 is a greatly enlarged, fragmentary, cross-sectional view of the modified agitator bars of FIG. 11 shown in the subassembly apparatus mounted in a molding machine.

A third embodiment of the subassembly is similar to the first embodiment of the subassembly 60 of FIG. 2 and is illustrated in FIGS. 11 and 12. The components of the third embodiment of the subassembly are identical to the components of the first embodiment of the subassembly 60 illustrated in FIGS. 2–7 except for the agitator bars which, in the third embodiment illustrated in FIGS. 11 and 12, are designated by reference numerals 90A″ and 90B″. The reference numerals for the other subassembly components shown in FIG. 12 remain the same as in FIGS. 2–7 for the first embodiment.

Each agitator bar 90A" and 90B" has spaced-apart, angled teeth 92A" and 90B", respectively, and projecting members 95A" and 95B", respectively. In these respects, the agitator bars 90A" and 90B" are identical to the agitator bars 90A and 90B, respectively, of the first embodiment of the subassembly 60 described above with reference to FIGS. 2–7. However, each agitator bar 90A" and 90B" also includes a unique biasing structure. Specifically, each agitator bar 90A' and 90B' is spring-biased from the bottom of the channel in its receiving tray in the frame 96 (FIG. 12) so as to force the agitator bar upwardly against the upstream side 72 of the foraminous member 62.

FIG. 12 (which shows the molding apparatus with the modified agitator bars in place) is a fragmentary, cross-sectional view that results after replacing the agitators bar 90A and 90B in FIG. 6 with the corresponding agitator bars 90A" and 90B" and then taking a transverse cross-section of the apparatus (90 degrees to the plane of FIG. 6 drawing).

With reference to agitator bar 90A", the bar is seen to have a base 300A" for being received in the associated tray 97A of the frame 96 (FIG. 12). The base 300A" defines a base projection 301A" at each end of the bar for supporting the bar in the frame tray 97A while accommodating deflection of a portion of the bar intermediate of the base projections 301A". The agitator bar 90A" defines an endwise slot 303A" at each end of the bar. Each slot 303A" extends only part way along the length of the bar and terminates short of the middle of the bar.

When the bar 90A" is mounted in the tray 97A and when the tray frame 96 is properly positioned within the subassembly as illustrated in FIG. 12, then the agitator bar teeth 92A" are urged against the foraminous member upstream side 72 under a force (e.g., 40–80 pounds) sufficient to decrease the width of the endwise slots at 303A" and sufficient to slightly deflect the portion of the agitator bar intermediate of the base projection 301A". In this manner, the ends of the agitator teeth 92A" are forced in tight engagement with the foraminous member upstream side 72. This provides for an even more effective dislodgement of the tissue fibers from the upstream side of the foraminous member 62 compared to those designs in which there is a small clearance between the agitator bar and the foraminous member upstream side 72 and even compared to those designs in which the agitator bar teeth are permitted to contact the foraminous member but are not biased against the foraminous member with a significant degree of force.

The design and operation of the other agitator bar 90B" are identical to the design and operation of the agitator bar 90A" described above. The elements of the agitator bar 90B" that are identical to the elements of the agitator bar 90A" are designated with the same reference numerals as used in the illustration of the agitator bar 90A" but the agitator bar 90B" reference numerals are followed by the designation B" rather than A".

FOURTH EMBODIMENT

Figure 13:
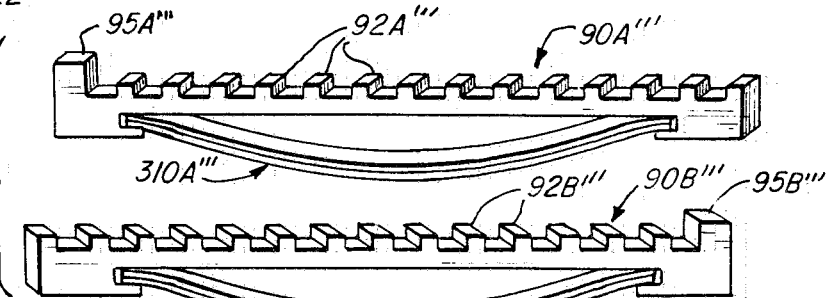
FIG. 13 is a perspective view of a another modified form of the two agitator bars which can be used in the subassembly apparatus as a fourth embodiment.
Figure 14:
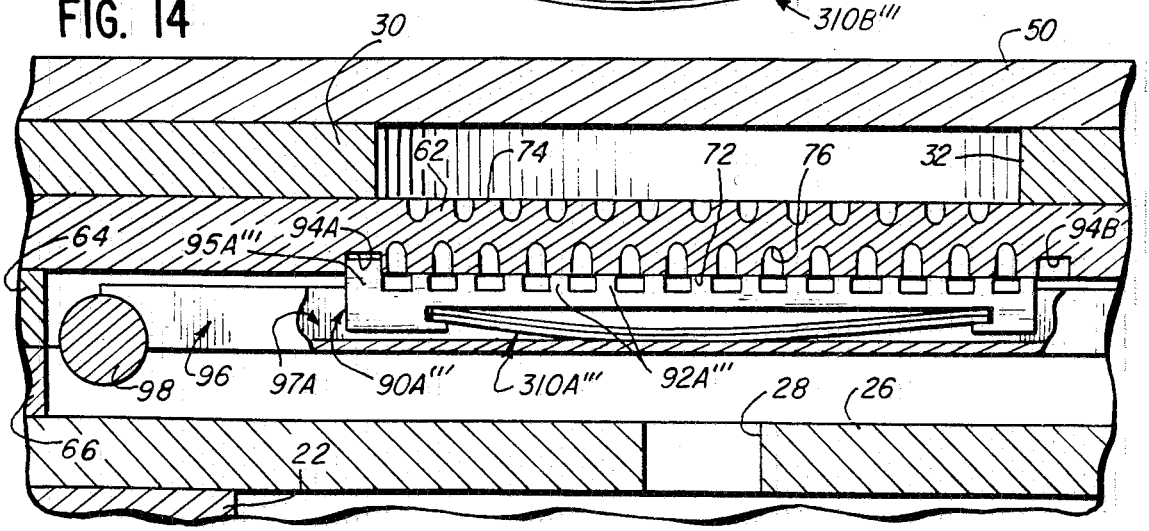
FIG. 14 is a greatly enlarged, fragmentary, cross-sectional view of the modified agitator bars of FIG. 13 shown in the subassembly apparatus mounted in a molding machine.

Another modification of the agitator bar construction is illustrated in FIGS. 13 and 14 which show two modified agitator bars, bar 90A''' and bar 90B'''. These bars 90A" and 90B" can be substituted for the bars 90A and 90B in the first embodiment of the subassembly 60 illustrated in FIGS. 2–7 to yield a fourth embodiment of the subassembly.

Each agitator bar has a plurality of spaced-apart teeth—teeth 92A''' for agitator bar 90A''' and teeth 92B''' for agitator bar 90B'''. Agitator bar 90A''' has a projecting guide member 95A''' for being received in the foraminous member slot 94A (FIG. 14) and the agitator bar 90B''' has a guide member 95B''' for being received in the guide slot 94B. Note that FIG. 14 is a cross-sectional view similar to FIG. 12 but with the agitator bar 90A" of FIG. 12 replaced with the agitator bar 90A''' of FIG. 13.

A unique structure is provided for biasing the agitator bars upwardly against the upstream side 72 of the foraminous member 62. Specifically, a leaf-spring 310A''' is provided on the bottom of the agitator bar 90A''' and a similarly spring 310B''' is provided on the bottom of the agitator bar 90B'''.

When each bar is disposed within the tray channel (channel 97A as illustrated in FIG. 14 for bar 90A'''), the leaf spring is compressed and stressed between the bottom of the associated agitator bar and the tray. This causes the agitator bar teeth to be urged upwardly against the upstream side 72 of the foraminous member 62 to provide an improved tissue dislodging action. It has been determined that the use of agitator bars biased against the upstream side of the foraminous member is particularly effective for molding patties of raw ground beef when the biasing force is on the order of 40–80 pounds.

FIFTH EMBODIMENT

Figure 15:
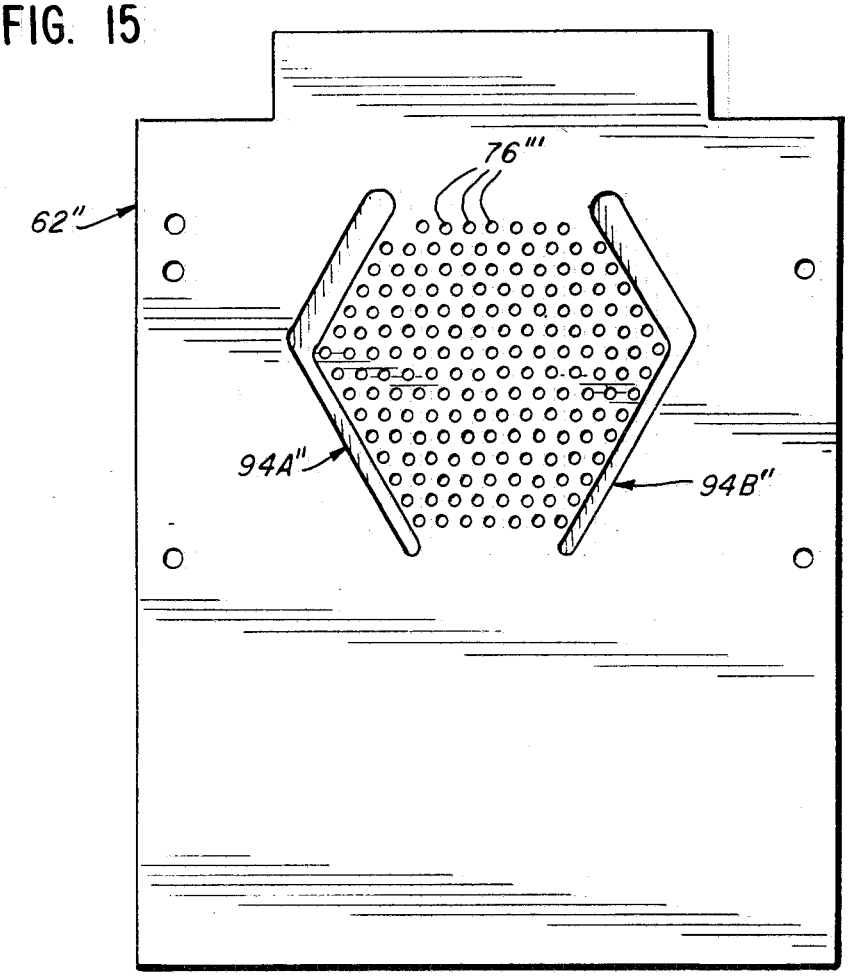
FIG. 15 is a plan view of the upstream side of a further modification of a foraminous member forming part of the subassembly apparatus as a fifth embodiment.

FIG. 15 illustrates another modified form of the foraminous member 62". The member 62" is similar to the member 62 of the first embodiment of the subassembly 60 described above with reference to FIGS. 2–7. However, the member 62" has differently shaped guide slots 94A" and 94B" and can be employed with the other components of the first embodiment of the subassembly 60 to form a fifth embodiment of the subassembly.

Each guide slot 94A" and 94B" has two angled portions or legs for guiding the associated agitator bar (not illustrated, but which may be identical or similar to the bars 90A and 90B described above with reference to FIGS. 2–7). One leg of each slot is parallel to one set of the rows of openings defined by the apertures 76" and the other leg of each slot is parallel to the other set of rows of openings defined by the apertures 76". Thus, each agitator bar will move parallel to one set of rows for the first part of its traverse along the member 62" and will then move parallel to the other set of rows for the second part of its traverse along the member 62". If the guide member of each agitator bar has an elongate shape (like the member 95A of the bar 90A illustrated in FIG. 4), then one leg of each associated guide slot 94A" or 94B" should be wider than the other leg as illustrated to accommodate the change in direction of the bar movement. If the guide member is instead provided in the form of a cylindrical pin, then both legs of each guide slot may be the same width.

With the two-legged guide slot design, the agitator bar teeth, if they are elongate and angled as are the teeth of the bars 90A and 90B illustrated in FIGS. 3–4, may pass over a portion of some of the apertures 76" during the second part of the bar traverse along the member 62". However, if this is not desired, the length of each tooth could be reduced as necessary.

OTHER MODIFICATIONS

The Foraminous Member

It is presently preferred to use the novel multiple agitator bar assembly according to the present invention with a foraminous member having non-vertical, cylindrical apertures. However, the multiple agitator bars may also be used with a foraminous member having some or all of the apertures that are vertically oriented. Furthermore, the apertures need not be circular in cross-section, and can have other shapes such as a square, a rectangle, an oval, a corkscrew, or a star shape to name but a few. The surface configuration between each aperture may also differ from those configurations shown in the illustrated embodiments.

In addition, the foraminous member need not be limited to an orientation where the food material is forced upwardly through the apertures. Instead, the foraminous member may be incorporated in configurations with multiple agitator bars where meat, or other food material, is forced horizontally or downwardly through the apertures and into a mold cavity.

The Agitator Bar Structure

Although the embodiments of the multiple agitator bars are illustrated in FIGS. 2–14 as having teeth, the disclosed molding apparatus is not to be limited to bars with tooth structures. Further, the relative movement between the foraminous member and the multiple agitator bars may differ from that described above with reference to FIGS. 2–15.

In the embodiments illustrated in FIGS. 2–15, it is to be realized that the agitator bars may remain stationary and that the foraminous member may be moved as necessary to effect the desired relative travel paths. Alternatively, both the foraminous member and the multiple agitator bars may be moved relative to each other, either together, or in an intermittent alternating sequence. Regardless of the nature of the relative motion between the multiple agitator bars and the foraminous member, such motion may be effected before, during, or after the step of forcing the food material through the foraminous member and into the mold cavity.

The paths of relative movement illustrated in FIGS. 2–15 are illustrative of some specific paths for the presently preferred embodiments. Of course, other paths of relative movement will be readily apparent.

In the embodiments illustrated in FIGS. 11–14, a variety of mechanisms are disclosed for biasing the multiple agitator bars into contact with the upstream surface of the foraminous member. It is to be realized that other biasing mechanisms may be employed. For example, in addition to various types of springs, sprung assemblies, and resilient mechanisms, it is also possible to use pneumatic devices or other biasing devices.

If no direct relative biasing between the multiple agitator bars and foraminous member is provided, any clearance between the agitator bar and the upstream surface of the foraminous member should be sufficiently small to permit an agitation of the food material in a manner sufficient to dislodge tissue fibers that may have lodged on the upstream side of the foraminous member.

The novel method, structure, and apparatus described herein for facilitating flow of tissue fibers through a foraminous member in a molding machine can be used in conjunction with other methods and apparatus for forming patties of food material. For example, if desired, the various disclosed embodiments of the multiple agitator bars may be used with the methods and apparatus disclosed in the above-discussed U.S. Pat. Nos. 4,272,864, 4,338,702, including with the disclosed method and apparatus for moving the food material first in one direction and then in a second, opposite direction through the foraminous member.

Also, the multiple agitator bars described herein may be used with the methods and apparatus disclosed in the above-discussed U.S. Pat. Nos. 4,343,068 and 4,356,595.

Further, the embodiments of the multiple agitator bars described herein may be used, with appropriate modifications, in conjunction with a variety of foraminous member designs including, but not limited to, (1) a foraminous member with vertical, non-inclined apertures, (2) a foraminous member with non-vertical apertures, (3) a foraminous member with slots connecting the apertures, and (4) a foraminous member with ribs on the upstream side.

From the foregoing, it will be understood that numerous variations and modifications may be effected without departing from the true spirit and scope of the novel concept of the invention. It is to be understood that no limitation with respect to the specific method and apparatus illustrated herein is intended or should be inferred. It is, of course, intended to cover by the appended claims all such modifications as fall within the scope of the claims.

What is claimed is:

1. A subassembly for modifying an apparatus for molding a patty of food material which contains tissue fibers wherein said apparatus includes at least (1) a food material reservoir, (2) a mold plate defining a mold opening adapted to be moved between a patty molding position and a patty ejecting position spaced away from said patty molding position, said mold opening defining at least a portion of a mold cavity into which the food material is forced from said food material reservoir to form a molded patty when said mold opening is in said patty molding position, and (3) means for moving said mold plate between said patty molding position and said patty ejecting position, said subassembly comprising:

(a) a foraminous member with an upstream side and a downstream side, said foraminous member having a plurality of apertures extending through said foraminous member between said upstream and downstream sides, said apertures defining an array of openings at said upstream side which are arranged in a first set of spaced-apart parallel rows and a second set of spaced-apart parallel rows wherein the rows of the first set are oriented at an acute angle relative to the rows of the second set, said foraminous member being adapted for being disposed between said food material reservoir and said mold plate at a location wherein at least some of said foraminous member openings are in registry with said mold opening when said mold plate is in said patty molding position;

(b) at least two agitator bars disposed adjacent said upstream side of said foraminous member for reciprocative movement along said upstream side, one of said agitator bars including a plurality of spaced-apart teeth oriented with at least one tooth between two adjacent rows of said first set of parallel rows of foraminous member openings, the other of said agitator bars including a plurality of spaced-apart teeth oriented with at least one tooth between two adjacent rows of said second set of parallel rows of foraminous member openings; and (c) means for reciprocating said agitator bars along said upstream side of said foraminous member with said one agitator bar moving along at least one path parallel to said first set of parallel rows of foraminous member openings and with said other agitator bar moving along at least another path parallel to said second set of parallel rows of foraminous member openings.

2. The subassembly in accordance with claim 1 in which said foraminous member upstream side has a generally flat, planar surface defining said array of foraminous member openings.

3. The subassembly in accordance with claim 1 in which said foraminous member upstream side defines a channel between two adjacent rows of foraminous member openings for receiving a tooth of one of said agitator bars.

4. The subassembly in accordance with claim 1 in which said foraminous member defines two non-arcuate guide slots in said upstream side; one of said guide slots having at least a first portion parallel to said first set of parallel rows of foraminous member openings and the other of said guide slots having at least a first portion parallel to said second set of parallel rows of foraminous member openings; and each said agitator bar having a projecting guide member for being received in one of said guide slots.

5. The subassembly in accordance with claim 1 in which the locus of motion of said cyclical movement of said mold plate is a straight line and in which said agitator bar reciprocating means includes two channel-like trays disposed adjacent said foraminous member upstream side, each said tray defining a straight channel opening toward said foraminous member with the length of said channel oriented normal to the straight line locus of motion of said mold plate, and each said tray being adapted to receive one of said agitator bars in the channel.

6. The subassembly in accordance with claim 5 including a pair of plates disposed below said foraminous member, said pair of plates defining an interior chamber adjacent the upstream side of said foraminous member;

a pair of guide rods slidably disposed between said pair of plates for reciprocating movement parallel to said locus of motion of said mold plate; and said two trays being generally disposed side-by-side and secured on each end to one of said guide rods.

7. The subassembly in accordance with claim 6 in which each said drive rod includes an end adapted to be engaged by said means for moving said mold plate whereby movement of said agitator bars occurs during at least a part of the movement of said mold plate.

8. The subassembly in accordance with claim 5 in which each said agitator bar is spring-biased from the bottom of said tray channel to force said agitator bar against said foraminous member upstream side.

9. The subassembly in accordance with claim 8 in which each said agitator bar has a base for being received in one of said trays, said base defining a base projection at each end for supporting said bar in said tray while accommodating a deflection of the portion of the agitator bar intermediate of said base projections, each said agitator bar defining an endwise slot at each end of the bar, each said slot terminating short of the middle of the bar whereby the agitator bar and its receiving tray can be positioned with the bar teeth against the foraminous member under a force sufficient to decrease the width of the endwise slots and deflect the portion of the agitator bar intermediate of said base projections.

10. The subassembly in accordance with claim 8 in which a leaf spring is disposed between each said agitator bar and the tray in which said agitator bar is disposed.

11. The subassembly in accordance with claim 1 in which said foraminous member is planar and in which at least some of said foraminous member apertures are each defined by a cylindrical bore.

12. A subassembly for modifying an apparatus for molding a patty of food material which contains tissue fibers wherein said apparatus includes at least (1) a food material reservoir; (2) a mold plate defining at least one mold opening adapted to be moved between a patty molding position and a patty ejecting position spaced away from said patty molding position, said mold plate defining at least a portion of a mold cavity communicating with said mold opening into which the food material is forced from said food material reservoir to form a molded patty when said mold opening is in said patty molding position; and (3) means for moving said mold plate between said patty molding position and said patty ejecting position, said subassembly comprising:

(a) a foraminous member with an upstream side and a downstream side, said foraminous member having a plurality of apertures extending through said foraminous member between said upstream and downstream sides, each said aperture defining an opening at said upstream of said foraminous member, said foraminous member being adapted for being disposed between said food material reservoir and said mold plate at a location wherein at least some of said foraminous member aperture openings are in registry with said mold opening when said mold plate is in said patty molding position;

(b) at least two agitator bars disposed adjacent said upstream side of said foraminous member for movement along said upstream side; and (c) means for linearly reciprocating each said agitator bar along a path that is at an angle to the path of reciprocation of the other agitator bar.

13. An apparatus for molding a patty of plastic food material which contains tissue fibers, said appratus comprising:

(a) a foraminous member defining an upstream side and a downstream side and having apertures communicating between said upstream and downstream sides;

(b) mold parts disposed adjacent said foraminous member, said mold parts having a mold cavity defining at least a portion of the exterior surface of said mold patty and having a mold opening to said mold cavity into which the food material can be forced through said foraminous member apertures to form a molded patty;

(c) means for forcing said food material under pressure from the upstream side of said foraminous member through said apertures to the downstream side of said foraminous member and into said mold opening and cavity as extrudate masses which together form said patty;

(d) at least two agitator bars disposed adjacent said upstream side of said foraminous member for movement along said upstream side; and (e) means for reciprocating each said agitator bar along a path that is at an angle to the path of reciprocation of the other agitator bar so as to produce agitation along said upstream side of said foraminous member to dislodge tissue fibers that may have lodged on the upstream side of said foraminous member.

14. A method for forming a patty of plastic food material containing tissue fibers, said method comprising the steps of:

(a) providing a foraminous member having an upstream side a downstream side with apertures in said foraminous member which communicate between said upstream side and said downstream side and which define an array of openings at said upstream side which are arranged in a first set of sapced-apart parallel rows and a second set of spaced-apart parallel rows wherin the rows of the first set are oriented at an acute angle relative to the rows of the second set;

(b) providing mold parts disposed adjacent said foraminous member with said mold parts having a mold cavity defining at least a portion of the exterior surface of said patty and having a mold opening to said mold cavity and relatively positioning said foraminous member and said mold parts to dispose said mold opening at a patty molding position adjacent said downstream side of said foraminous member;

(c) forcing said food material under pressure from the upstream side of foraminous member through said apertures to the downstream side of said foraminous member and into said mold opening and cavity as extrudate masses which together form said patty; and (d) providing at least two agitator bars adjacent said upstream side of said foraminous member with one of said agitator bars having a plurality of spaced-apart teeth oriented with each tooth located between two adjacent rows of said first set of parallel rows of foraminous member openings and with the other of said agitator bars having a plurality of spaced-apart teeth oriented with each tooth between two adjacent rows of said second set of parallel rows of foraminous member openings, and then, before, during, or after step (c), reciprocating each said agitator bar along a path that is at an angle to the path reciprocation of the other agitator bar, the paths of travel of the teeth of said one agitator bar and the path of travel of the teeth of said other agitator bar defining parallelograms that each separately circumscribe one of the foraminous member aperture openings whereby the food material adjacent said upstream side of said foraminous member is agitated to dislodge tissue fibers that may have lodged on the upstream side of said foraminous member.

15. A method for forming a patty of plastic food material containing tissue fibers, said method comprising the steps of:

(a) providing a foraminous member having an upstream side and a downstream side with apertures in said foraminous member communicating between said upstream side and said downstream side;

(b) providing mold parts disposed adjacent said foraminous member with said mold parts having a mold cavity defining at least a portion of the exterior surface of said patty and having a mold opening to said mold cavity and relatively positioning said foraminous member and said mold parts to dispose said mold opening at a patty molding position adjacent said downstream side of said foraminous member;

(c) forcing said food material under pressure from the upstream side of said foraminous member through said apertures to the downstream side of said foraminous member and into said mold opening as extrudate masses which together form said patty; and (d) providing at least two agitator bars adjacent said upstream side of said foraminous member, and at least during step c), effecting relative movement between said foraminous member and each said agitator bar with said agitator bars disposed along said upstream side of said foraminous member whereby the food material adjacent said upstream side of said foraminous member is agitated to dislodge tissue fibers that may have lodged on the upstream side of said foraminous member.

16. A method for forming a patty of plastic food material containing tissue fibers, said method comprising the steps of:

(a) providing a foraminous member having an upstream side and a downstream side with apertures in said foraminous member communicating between said upstream side and said downstream side;

(b) providing mold parts disposed adjacent said foraminous member with said mold parts having a mold cavity defining at least a portion of the exterior surface of said patty and having a mold opening to said mold cavity and relatively positioning said foraminous member and said mold parts to dispose said mold opening at a patty molding position adjacent said downstream side of said foraminous member;

(c) forcing said food material under pressure from the upstream side of said foraminous member through said apertures to the downstream side of said foraminous member and into said mold opening as extrudate masses which together form said patty;

(d) during or after step (c), moving at least some of said mold parts in a first straight line path to and fron said patty molding position; and (e) providing at least two agitator bars adjacent said upstream side of said foraminous member and then, before, during, or after step (c), moving each said agitator bar across said upstream side of said foraminous member and in a straight line path that is at an relative to said first straight line path of said mold parts whereby the food material adjacent said upstream side of said foraminous member is agitated to dislodge tissue fibers that may have lodged on the upstream side of said foraminous member.

* * * * *